(12) United States Patent
Hassler

(10) Patent No.: US 10,590,995 B2
(45) Date of Patent: Mar. 17, 2020

(54) CLUTCH ASSEMBLY HAVING MOUNTING RING

(71) Applicant: ACE MANUFACTURING AND PARTS CO., Sullivan, MO (US)

(72) Inventor: Ethan R. Hassler, Villa Ridge, MO (US)

(73) Assignee: ACE MANUFACTURING AND PARTS CO., Sullivan, MO (US)

( * ) Notice: Subject to any disclaimer, the term of this patent is extended or adjusted under 35 U.S.C. 154(b) by 100 days.

(21) Appl. No.: 15/906,072

(22) Filed: Feb. 27, 2018

(65) Prior Publication Data
US 2019/0264754 A1    Aug. 29, 2019

(51) Int. Cl.
*F16D 13/46* (2006.01)
*F16D 13/58* (2006.01)
*F16D 13/70* (2006.01)

(52) U.S. Cl.
CPC ........... *F16D 13/46* (2013.01); *F16D 13/585* (2013.01); *F16D 13/70* (2013.01); *F16D 2013/706* (2013.01); *F16D 2300/26* (2013.01)

(58) Field of Classification Search
None
See application file for complete search history.

(56) References Cited

U.S. PATENT DOCUMENTS

| | | |
|---|---|---|
| 3,086,634 A | 4/1963 | Reed |
| 3,981,381 A | 9/1976 | Nosek |
| 4,616,741 A * | 10/1986 | Billet ................ F16D 13/71 192/70.18 |
| 4,751,990 A | 6/1988 | Schraut et al. |
| 5,950,786 A | 9/1999 | Mahoney |
| 6,039,161 A | 3/2000 | Tanaka et al. |
| 6,070,708 A | 6/2000 | Fukuda et al. |
| 6,866,132 B2 | 3/2005 | Gochenour et al. |
| 8,146,726 B2 | 4/2012 | McCutcheon et al. |
| 8,459,427 B2 | 6/2013 | McCutcheon et al. |

FOREIGN PATENT DOCUMENTS

DE        10218365 A1    10/2002

* cited by examiner

*Primary Examiner* — Timothy Hannon
(74) *Attorney, Agent, or Firm* — David E. Crawford; Crawford IP Law

(57) ABSTRACT

A clutch assembly including a cover and a mounting ring having a plurality of arms extending outwardly to a strap mount. The assembly includes strap springs. Each strap spring has a first end connected to the strap mount and a second end opposite the first. The clutch assembly includes an annular pressure plate and a plurality of outwardly extending tabs. Each tab is releasably connected to the second end of a corresponding strap spring so the strap springs biases the pressure plate away from the flywheel. The assembly includes a keeper and a resilient diaphragm spring that biases the pressure plate toward the flywheel, deforming each strap spring, so the strap spring biases the annular pressure plate away from the flywheel. The diaphragm ring is resiliently deformable to a deformed position, allowing each strap spring to move the pressure plate away from the flywheel.

28 Claims, 9 Drawing Sheets

CLUTCH ASSEMBLY HAVING MOUNTING RING

BACKGROUND

The present disclosure relates to clutches for selectively transmitting torque, and more particularly, a clutch assembly including a mounting ring having a fulcrum for a diaphragm spring and arms for connecting strap springs that bias a pressure plate away from a flywheel.

A clutch assembly is frequently mounted on a vehicle flywheel transmitting driving torque from an engine to a transmission. The clutch assembly generally includes a clutch cover that is fixed to the flywheel and houses a diaphragm spring, a pressure plate, and a friction disc. The diaphragm spring moves the pressure plate relative to the cover and flywheel to engage and disengage the friction disc. As the pressure plate engages the friction disc, the pressure plate forces the friction disc to engage the flywheel and clamps the friction disc between the pressure plate and flywheel. Torque is transferred from the flywheel to the friction disc when the pressure plate clamps the friction disc to the flywheel with sufficient force. A shaft connects the friction disc to a transmission. A thrust bearing mounted on the shaft moves the diaphragm spring to engage and disengage the clutch as described above.

Various improvements have been made to the previously described structure. For example, some clutch assemblies include a series of pressure plates sandwiching multiple friction discs. When the pressure plates clamp the friction discs, the resulting clamped interfaces provide a comparatively larger engagement area that allow more torque to be transmitted by the clutch assembly. Frequently, the original equipment flywheel must be replaced when replacing original clutch assemblies with clutch assemblies having multiple pressure plates and friction discs to provide appropriate axial positioning. One manufacturer has solved this problem by providing an adapter ring between the clutch cover and the flywheel.

Many clutch assemblies include springs (e.g., coil springs or strap springs) that bias the pressure plate toward a neutral position in which the pressure plate is spaced from the friction disc to minimize friction and wear when the clutch is disengaged. These clutch assemblies have diaphragm springs that bias the pressure plates toward the friction discs. The thrust bearing deforms the diaphragm spring to allow the pressure plate to move away from the friction disc. Fulcrums and bosses are frequently provided inside the clutch cover against which forces react created when the diaphragm spring bends.

SUMMARY

In one aspect, a clutch assembly comprises a cover having an outer flange surrounding a central axis. The flange is adapted for connecting to a flywheel for turning about the central axis of the cover. The assembly also includes a mounting ring releasably connected to the cover. The mounting ring includes an engagement fulcrum centered about the central axis and a plurality of arms extending outwardly to a strap mount. In addition, the assembly comprises a plurality of resilient strap springs. Each strap spring of the plurality of strap springs has a first end releasably connected to the strap mount of a corresponding arm of the plurality of arms and a second end opposite the first end. Further, the clutch assembly includes an annular pressure plate having an annular boss centered about the central axis of the cover and a plurality of outwardly extending tabs. Each tab of the plurality of tabs is releasably connected to the second end of a corresponding strap spring of the plurality of strap springs, so the plurality of strap springs biases the pressure plate away from the flywheel when the cover flange is connected to the flywheel. A keeper is releasably connected to the mounting ring. The keeper includes a release fulcrum centered about the central axis and opposing the engagement fulcrum of the mounting ring at a predetermined distance from the engagement fulcrum. In addition, the clutch assembly has a resilient diaphragm spring captured between the engagement fulcrum of the mounting ring and the release fulcrum of the keeper. The diaphragm spring has an annular spring body and a plurality of levers. Each lever of the plurality of levers extends inwardly from the spring body to an inner end. The diaphragm spring biases the annular pressure plate toward the flywheel when the cover is connected to the flywheel, thereby deforming each strap spring of the plurality of strap springs to a configuration in which the strap spring biases the annular pressure plate away from the flywheel when the cover is connected to the flywheel. The diaphragm ring is resiliently deformable by axially displacing the inner ends of the plurality of levers to a deformed position thereby rotating the spring body between the engagement fulcrum and the release fulcrum against the bias of the diaphragm ring and allowing each strap spring of the plurality of strap springs to move the pressure plate away from the flywheel when the cover is connected to the flywheel to disengage the flywheel.

In another aspect, a clutch assembly comprises a bowl-shaped cover having a concave face and an outer flange surrounding the concave face and a central axis. The assembly includes a mounting ring releasably connected to the concave face of the cover. The mounting ring has a fulcrum ridge centered about the central axis and a plurality of arms extending outwardly to a strap mount. In addition, the assembly includes a keeper releasably connected to the mounting ring. The keeper includes a release fulcrum centered about the central axis opposing the fulcrum ridge of the mounting ring at a predetermined distance. Moreover, the clutch assembly comprises a resilient diaphragm spring captured between the fulcrum ridge of the mounting ring and the release fulcrum of the keeper. The diaphragm spring has an annular spring body and a plurality of levers. Each lever of the plurality of levers extends inwardly from the spring body to an inner end. The clutch assembly also includes a plurality of primary strap springs. Each strap spring of the plurality of primary strap springs has a first end releasably connected to the strap mount of a corresponding arm of the plurality of arms and a second end opposite the first end. Further, the clutch assembly includes a primary annular pressure plate having an annular boss centered about the central axis of the cover and a plurality of outwardly extending tabs. Each tab of the plurality of tabs is releasably connected to the second end of a corresponding strap spring of the plurality of primary strap springs. The clutch assembly also has a plurality of secondary strap springs. Each strap spring of the plurality of secondary strap springs has a first end releasably connected to the first end of a corresponding strap spring of the plurality of primary strap springs and a second end opposite the first end. Further, the assembly comprises a secondary annular pressure plate having a plurality of outwardly extending tabs. Each tab of the plurality of tabs of the secondary annular pressure plate is releasably connected to the second end of a corresponding strap spring of the plurality of secondary strap springs. Moreover, the clutch assembly comprises a flywheel releasably connected to the outer flange of the cover and a first friction disc positioned between the primary pressure plate and the secondary pressure plate. The primary friction disc includes a first friction surface surrounding a central hub facing the primary pressure plate and a second friction surface opposite the first friction surface of the first friction disc facing the secondary pressure plate. The primary pressure plate engages the first friction surface of the first friction disc when axially moved to a first engaged position and the second friction surface of the first friction disc engaging the secondary pressure plate when axially moved past the first engaged position to a secondary engaged position. Lastly, the clutch assembly includes a second friction disc positioned between the secondary pressure plate and the flywheel. The second friction disc includes a first friction surface surrounding a central hub facing the secondary pressure plate and a second friction surface opposite the first friction surface of the second friction disc facing the flywheel. The secondary pressure plate engages the first friction surface of the second friction disc when axially moved to a third engaged position and the second friction surface of the second friction disc engaging the flywheel when axially moving to a fourth engaged position, in which contacting interfaces between the pressure plate and the first friction disc, between the first friction disc and the secondary pressure plate, between the secondary pressure plate and the second friction disc, and between the second friction disc and the flywheel are capable of transmitting torque between the cover and the central hubs of the primary and second friction discs.

In yet another aspect, a clutch assembly comprises a cover having an outer flange surrounding a central axis. The flange is adapted for connecting to a flywheel for turning about the central axis of the cover. The assembly also includes a mounting ring releasably connected to the cover. The mounting ring includes a plurality of arms extending outwardly to a strap mount. Further the clutch assembly comprises a plurality of resilient strap springs, each of which has a first end releasably connected to the strap mount of a corresponding arm of the plurality of arms and a second end opposite the first end. In addition, the assembly includes an annular pressure plate having a plurality of outwardly extending tabs. Each tab is releasably connected to the second end of a corresponding strap spring of the plurality of strap springs so the plurality of strap springs biases the pressure plate away from the flywheel when the cover flange is connected to the flywheel. The clutch assembly also has a keeper releasably connected to the mounting ring and a resilient diaphragm spring positioned between the cover and the keeper. The diaphragm spring has an annular spring body and a plurality of levers. Each lever of the plurality extends inwardly from the spring body to an inner end. The diaphragm ring biases the annular pressure plate toward the flywheel when the cover is connected to the flywheel, thereby deforming each strap spring of the plurality of strap springs to a configuration in which the strap spring biases the annular pressure plate away from the flywheel when the cover is connected to the flywheel. The diaphragm ring is resiliently deformable by axially displacing the inner ends of the plurality of levers to a deformed position. As a result, the spring body rotates between the mounting ring and the keeper against the bias of the diaphragm ring and allows each strap spring of the plurality of strap springs to move the pressure plate away from the flywheel when the cover is connected to the flywheel to disengage the flywheel.

Other aspects will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
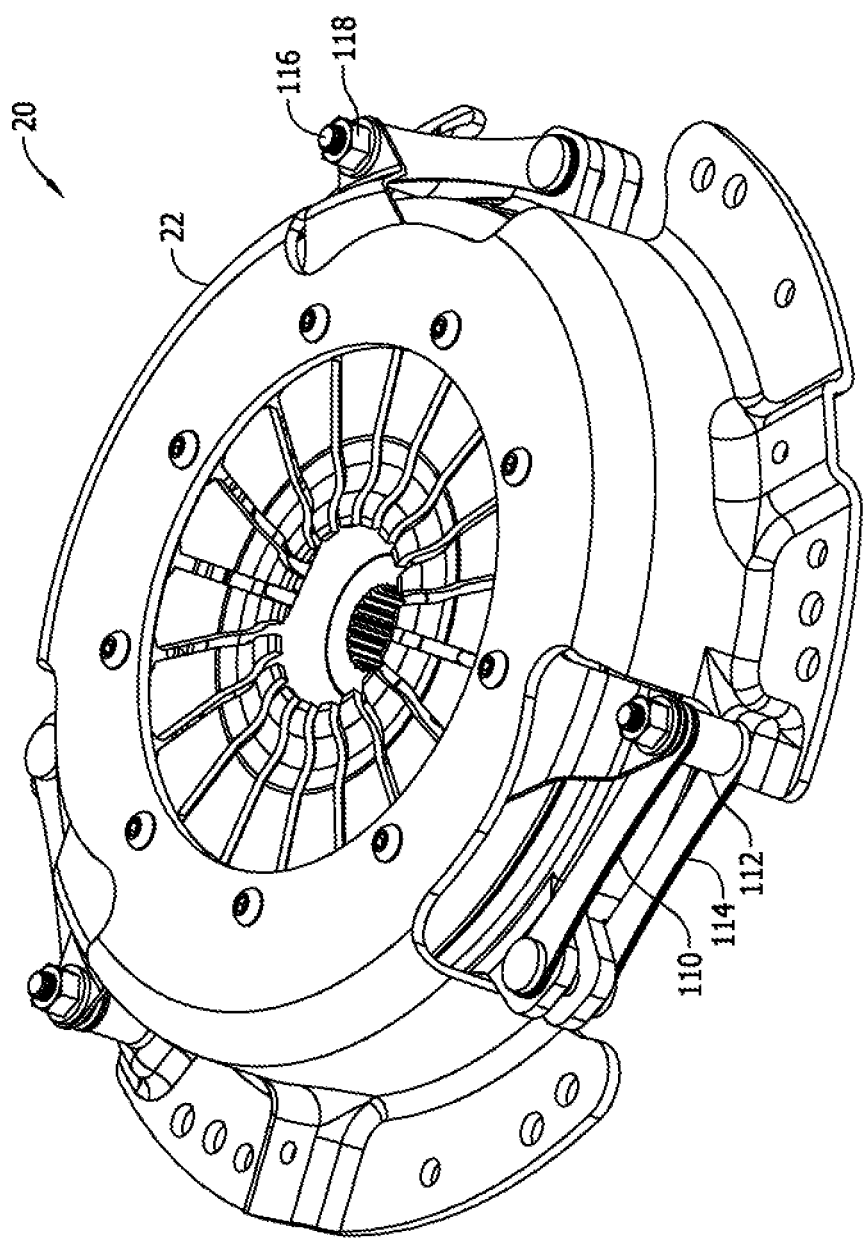
FIG. 1 is a perspective of a clutch assembly.
Figure 2:
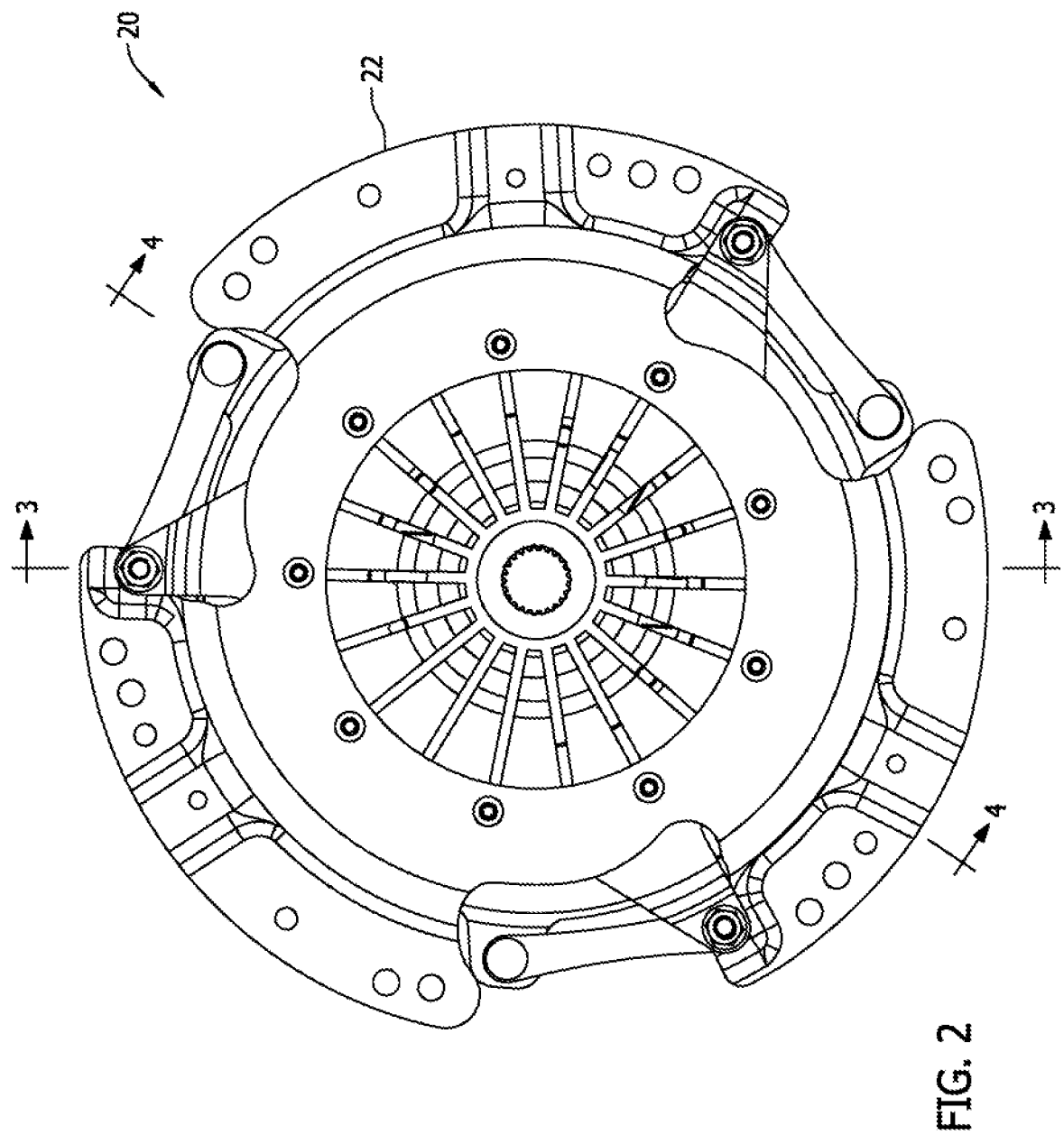
FIG. 2 is an end elevation of the assembly.

Referring to FIGS. 1 and 2, a clutch assembly is designated in its entirety by the reference number 20. As will be appreciated by those skilled in the art, the clutch assembly 20 selectively interconnects a driving member or driving shaft I (FIG. 3), such as an engine crankshaft of an automobile, with a driven member or driven shaft O (FIG. 3), such as a transmission gearbox input shaft. The driving shaft I and the driven shaft O are operatively connected through the clutch assembly 20, allowing torque to be transmitted between the shafts the driving shaft rotates. A vehicle operator selectively actuates the clutch assembly 20 to disengage the clutch, interrupting torque transmission between the shafts to allow the operator to shift gears in a vehicle transmission (not shown) connected to the driven shaft.

Figure 3:
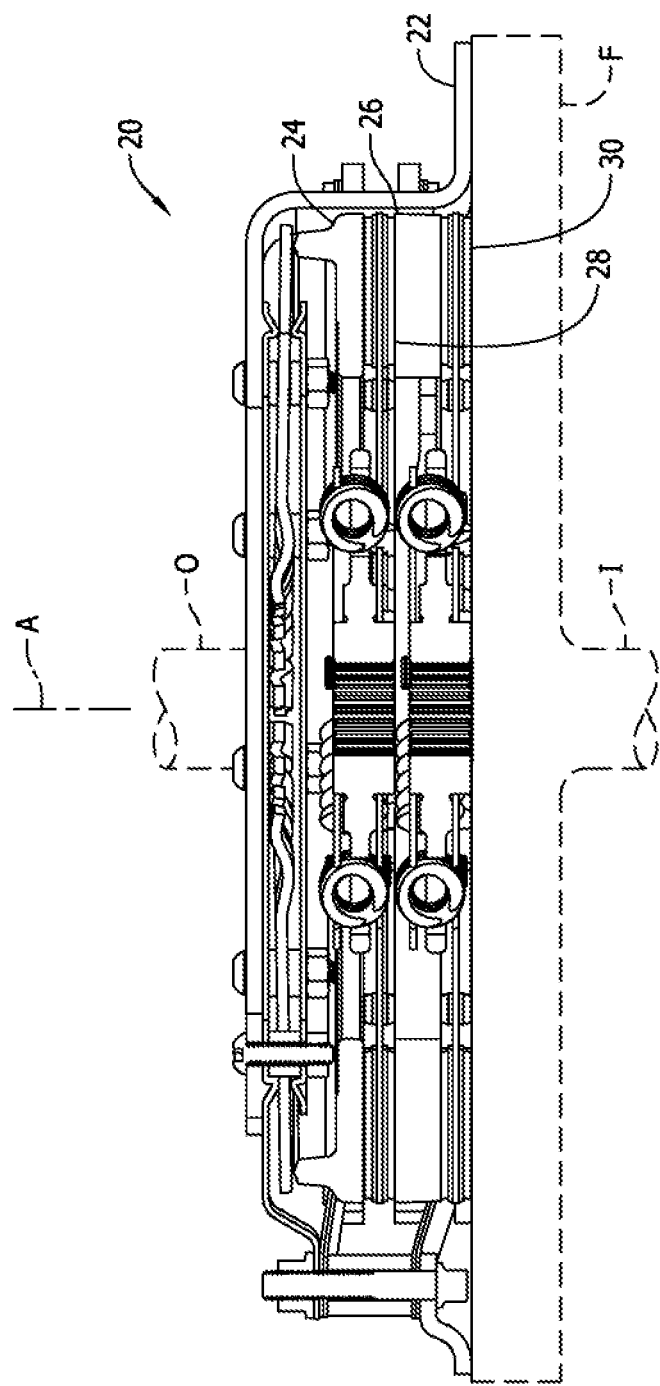
FIG. 3 is a cross section of the assembly taken in the plane of line 3-3 of FIG. 2.
Figure 4:
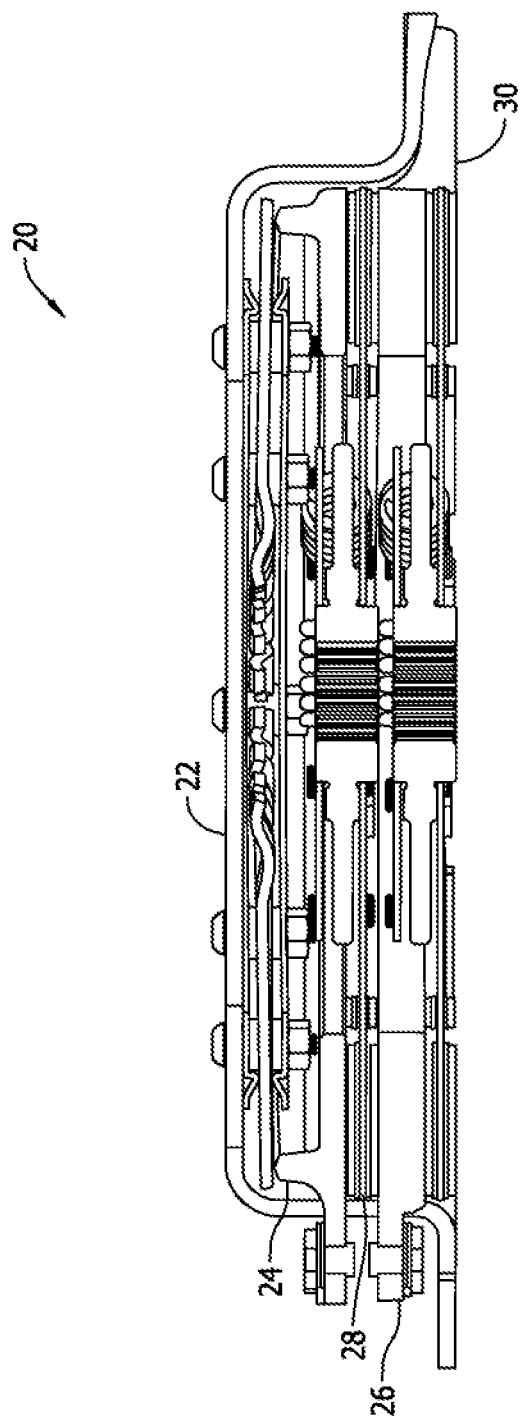
FIG. 4 is a cross-section of the assembly taken in the plane of line 4-4 of FIG. 2.
Figure 5:
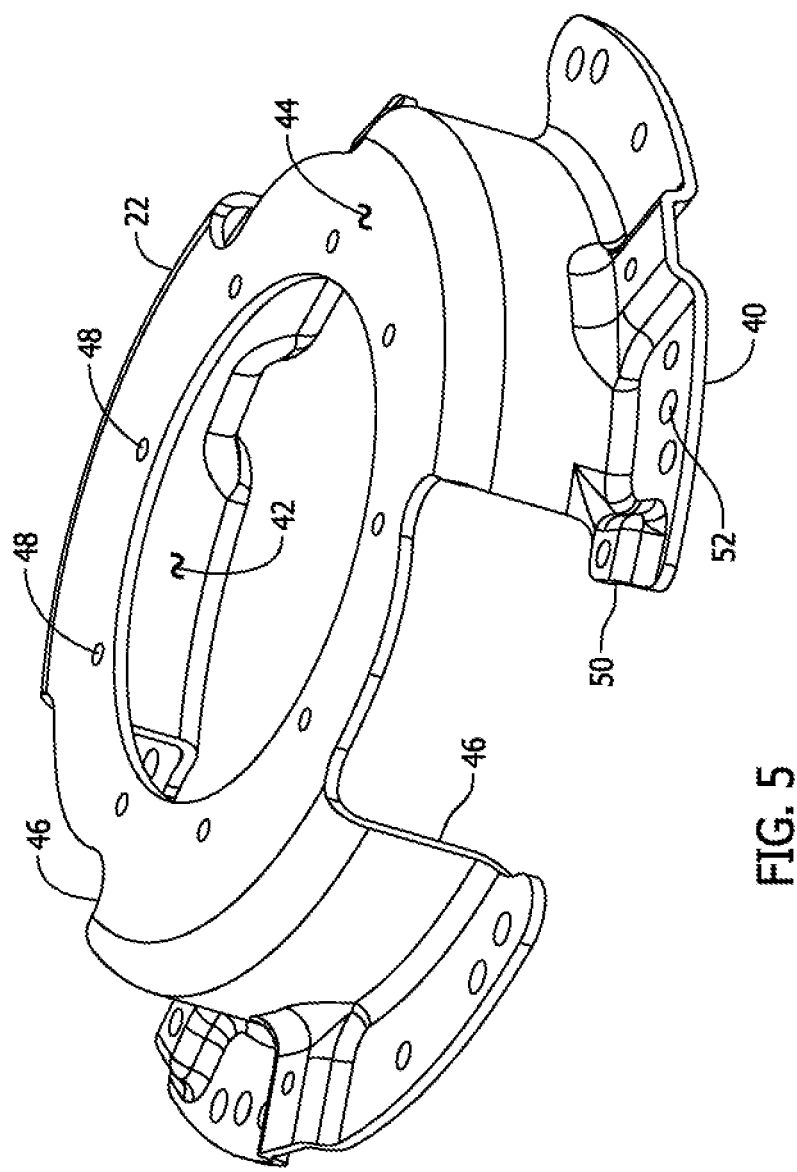
FIG. 5 is a perspective of a cover of the clutch assembly.

As shown in FIGS. 3 and 4, the clutch assembly 20 includes a cover 22, a primary pressure plate 24, a secondary or intermediate pressure plate 26, a conventional primary friction disc, generally designated by 28, and a conventional secondary friction disc, generally designated by 30, coaxially aligned on a common central axis A. As shown in FIG. 5 the cover 22 is generally bowl-shaped, having an outer flange 40 surrounding a central concave portion 42 sized and configured for housing clutch assembly components. The central concave portion 42 includes a planar surface 44 and three equally-spaced openings 46. The planar surface 44 includes holes 48 for receiving fasteners as explained below. The outer flange 40 includes pockets 50 adjacent the circumferential openings 46 for receiving fastener heads and holes 52 for fastening the clutch assembly 22 to the flywheel F (FIG. 3). The pockets 50 provide space for the fastener heads so the flange 40 can be mounted flush with the flywheel F. Although the cover 22 may be made of other materials, the illustrated cover is formed from ASTM 1006 mild drawing carbon steel.

Figure 6:
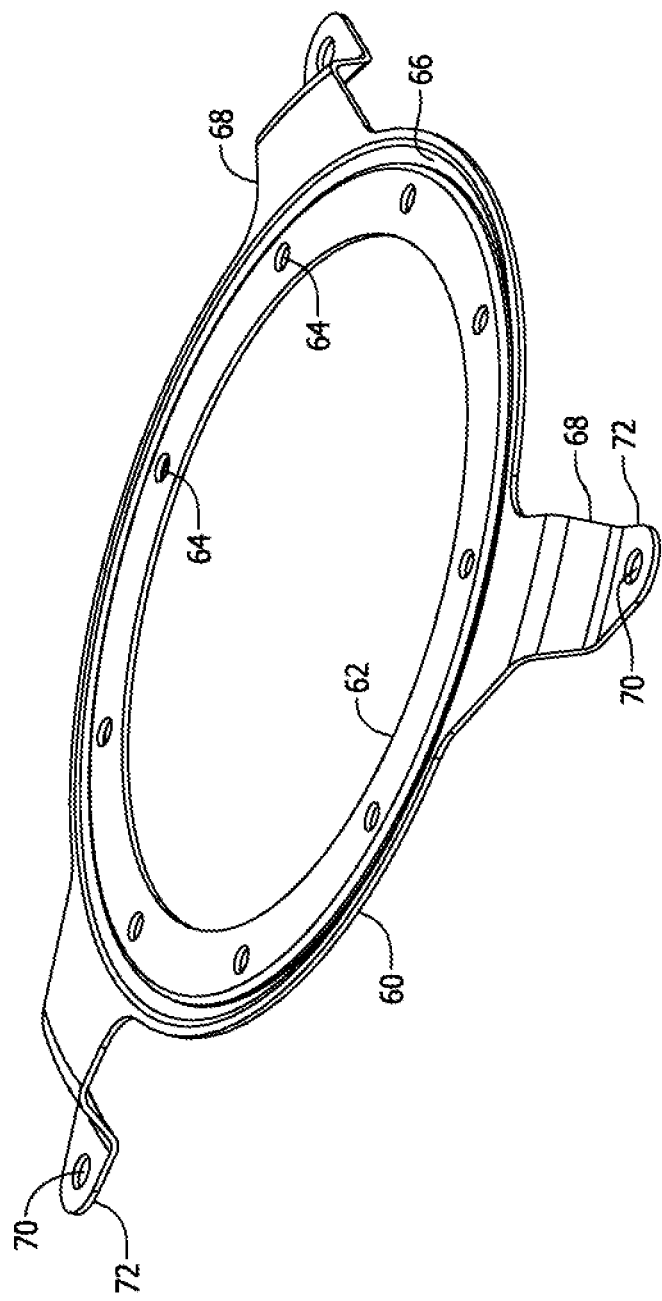
FIG. 6 is a perspective of a mounting ring of the assembly.

A mounting ring 60 as illustrated in FIG. 6 is fastened to the planar surface 44 of the cover 22. The mounting ring 60 includes an annular body 62 having holes 64 corresponding to the holes 48 on the planar surface 44 of the clutch cover 22. The annular body 62 has an annular rib forming an annular engagement fulcrum 66 that is centered about the central axis A of the assembly 20. Three arms 68 extend outward from the annular body 62. Although the arms 68 may have other shapes, each illustrated arm has a stepped shape, so the end of the arm is axially offset from the annular body 62 and the engagement fulcrum 66. A hole 70 is provided through the flat land near the end of each arm 68, forming a strap mount 72. Those skilled in the art will appreciate the strap mount 72 could have other configurations without departing from the scope of this disclosure. Although the mounting ring 60 may be made of other materials, the illustrated mounting ring is formed from 16 gauge (0.059 inches thick) ASTM 4130 steel sheet.

Figure 7:
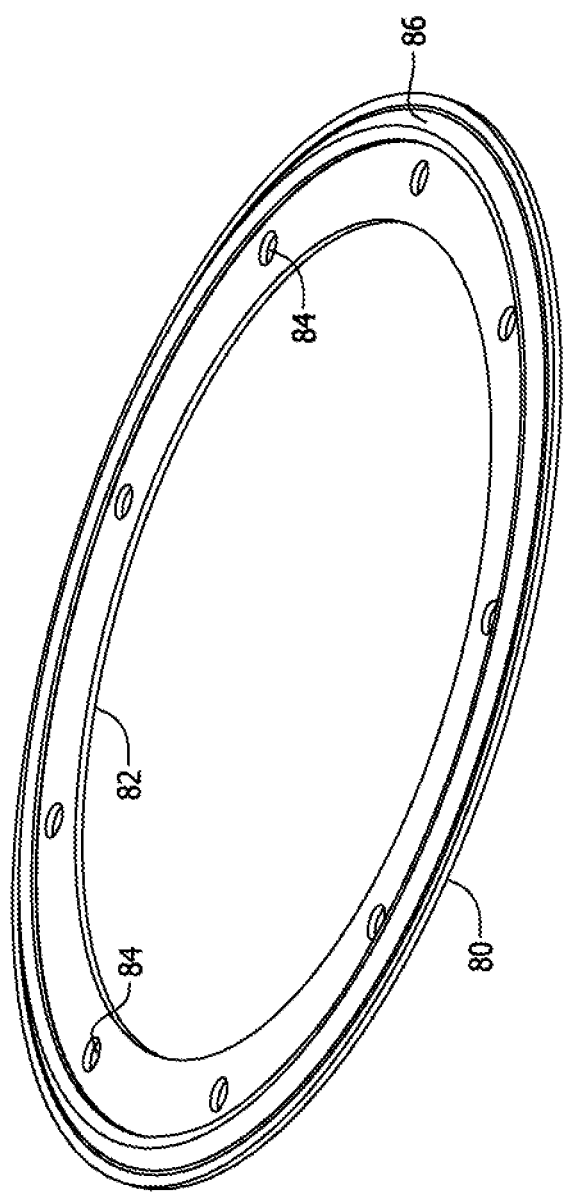
FIG. 7 is a perspective of an engagement fulcrum of the assembly.

A keeper 80 as shown in FIG. 7 is fastened to the cover 22 and mounting ring 60. The keeper 80 includes an annular body 82 having holes 84 corresponding to the holes 48, 64 of the clutch cover 22 and mounting ring 60, respectively. The annular body 82 has an annular rib forming an annular release fulcrum 86 that is centered about the central axis A of the assembly 20. Although the keeper 80 may be made of other materials, the illustrated keeper is formed from 16 gauge ASTM 4130 steel sheet.

Figure 8:
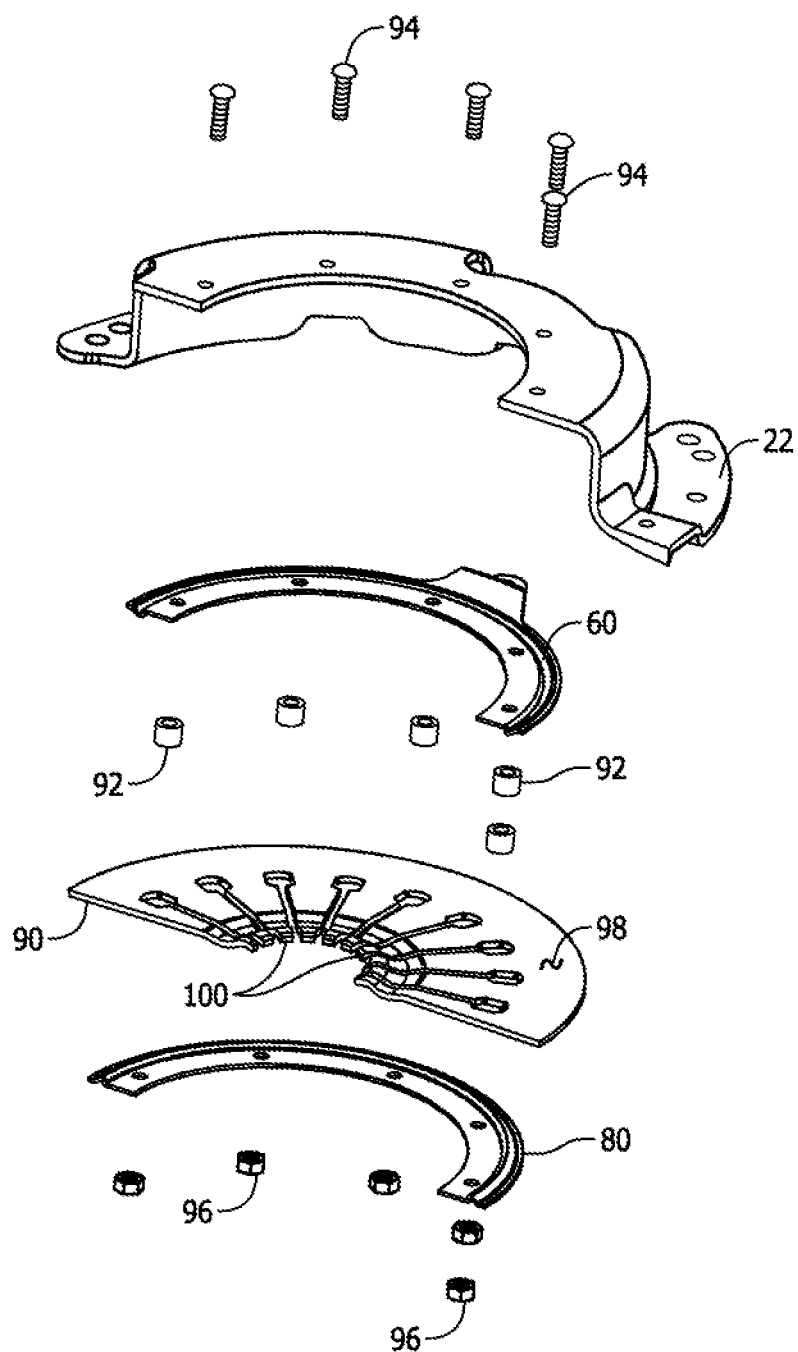
FIG. 8 is a separated cross-sectional perspective of a cover and fulcrum subassembly.

When assembled, the mounting ring 60 is positioned adjacent the inner concave surface of the cover 22, and the engagement fulcrum 66 of the mounting ring 60 and the release fulcrum 86 of the keeper 80 face each other as shown in FIG. 8. A conventional diaphragm spring 90 is positioned between the engagement fulcrum 66 and the release fulcrum 86. Spacers 92 extend through openings in the diaphragm spring to ensure proper spacing between the engagement fulcrum 66 and the release fulcrum 86. Although the spacers 92 may be made of other materials, the illustrated spacers 92 are made of steel. Removable fasteners (e.g., screws 94 and nuts 96) connect the keeper 80, diaphragm spring 90, and mounting ring 60 to the cover 22 as illustrated in FIG. 8. The mounting ring 60 is oriented so the arms 68 extend through the openings 46 in the cover 22. The diaphragm spring 90 has a resilient annular spring body 98 and a plurality of levers 100 extending inward from the spring body to respective inner ends. The spring body 98 has a shallow conical configuration that flattens when the levers 100 are pushed toward the flywheel F to disengage the clutch as will be described below.

Figure 9:
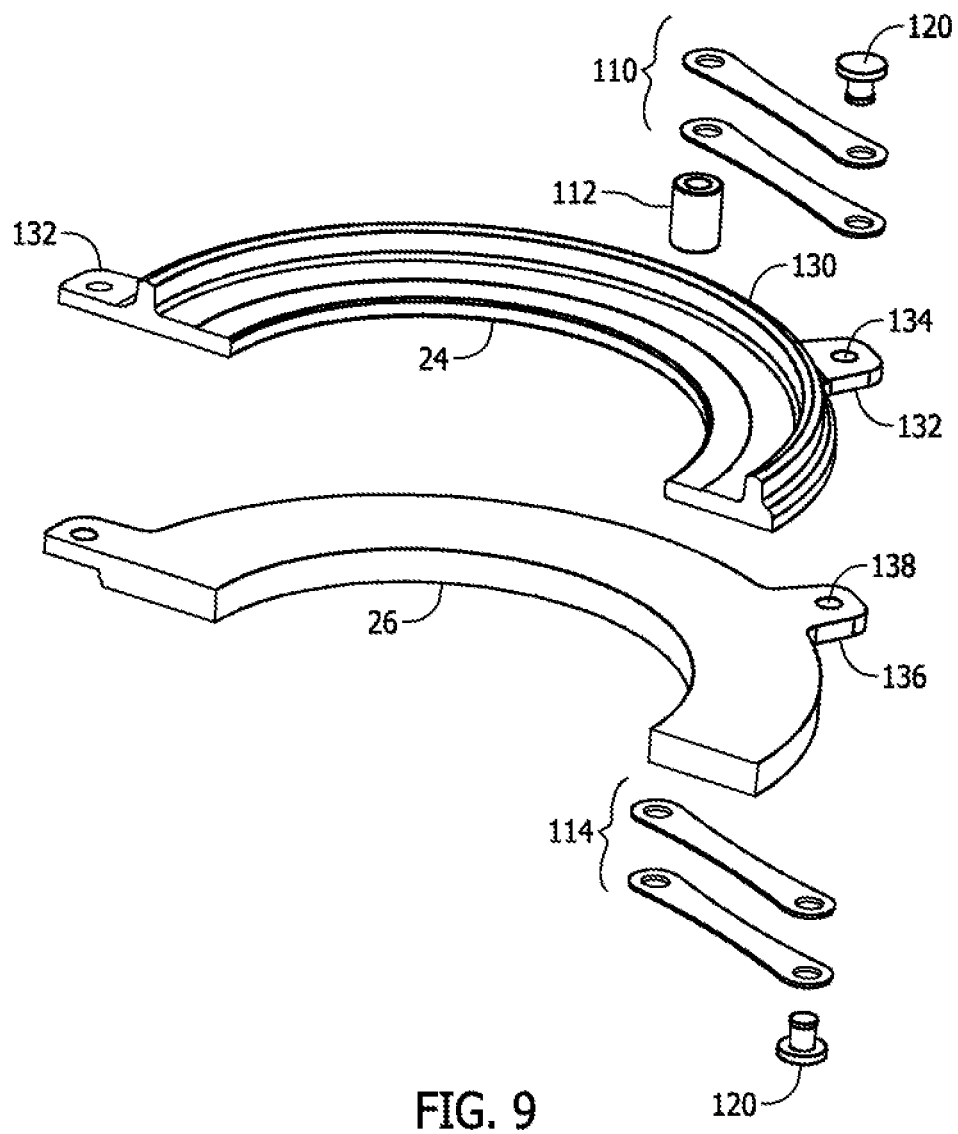
FIG. 9 is a separated cross-sectional perspective of a portion of a pressure plate subassembly of the clutch assembly.

As further illustrated in FIG. 1, a primary strap spring 110, a spacer 112, and a secondary strap spring 114 are fastened between a strap mount 72 and a corresponding pocket 50 with a bolt 116 and nut 118. Although the strap springs 110, 114 may have other configurations, each illustrated strap spring is formed from a pair of stacked spring leaves as shown in FIG. 9. Each illustrated spring leaf is 19 gauge (0.042 inches thick) and is made from ASTM 1070 or ASTM 1095 spring steel. The first end of each strap spring 110, 114 is fastened to the cover 22. As shown in FIG. 9, the second end of the primary strap spring 110 is fastened to the primary pressure plate 24 and the second end of the secondary strap spring 114 is fastened to the intermediate pressure plate 26. Although other fasteners may be used, the illustrated fasteners are rivets 120 pressed into corresponding openings in the respective pressure plates 24, 26. The primary pressure plate 24 includes an annular boss 130 centered about the central axis A of the assembly 20. The diaphragm spring 90 engages the boss 130 when pushing the primary pressure plate 24 toward the primary friction disc 28. Three equally-spaced tabs 132 having openings 134 are provided for receiving the rivets 120. Once in place, the rivets 120 are deformed to hold them in position. The secondary pressure plate 26 includes three equally-spaced tabs 136 having openings 138 are provided for receiving the rivets 120. The second end of the secondary strap spring 114 is fastened to the intermediate pressure plate 26 using rivets 120 as described above.

When the strap springs 110, 114 are assembled as described and shown, the diaphragm spring 90 is shaped to engage the boss 130 on the primary pressure plate 24 and bias the primary pressure plate toward the flywheel F. As a result of this arrangement, corresponding surfaces of the pressure plates 24, 26, the friction discs 28, 30, and the flywheel F are engaged and the ends of each strap spring are axially offset. The axial offset bends the strap springs 110, 114 as shown in FIG. 3. When bent, the resilient strap springs 110, 114 bias the corresponding pressure plate 24, 26 away from the flywheel F. Thus, when the levers 100 of the diaphragm spring 90 are pushed to flatten the diaphragm spring body 98, moving the body away from the boss 130 on the primary pressure plate 24, the strap springs 110, 114 move the primary and secondary pressure plates 24, 26 to a neutral position, disengaging the previously engaged surfaces on the pressure plates, friction discs 28, 30, and flywheel F.

In operation, the cover 22 is fixedly connected to the flywheel F mounted on the driving shaft I so the cover 22 rotates in unison with the flywheel and driving shaft about their common central axis A. Both the primary pressure plate 24 and the intermediate pressure plate 26 are connected to the cover 22, so they also turn in unison with the cover. Because springs 110 connect the primary pressure plate 24 to the cover 24, the primary pressure plate is axially movable with respect to the cover between an engaged position and a disengaged position. In the engaged position, the primary pressure plate 24 is forced against the primary friction disc 28, so torque is transmittable between the primary pressure plate and primary friction disc. The primary friction disc 28 has a splined central opening configured to receive the driven shaft O. The resulting spline connection enables the primary friction disc 28 to move axially with respect to the driven shaft O, so the primary friction disc moves and engages the intermediate pressure plate 26 as the primary pressure plate 24 moves to a second engaged position. More torque is transmittable between the engaged plates and discs because more surface area is in contact. Because springs 110, 114 connect the intermediate pressure plate 26 to the cover 22, the intermediate pressure plate is axially movable with respect to the cover and primary pressure plate 24, so the intermediate pressure plate moves and engages the secondary friction disc 30 as the primary pressure plate moves farther. The resulting increase in contacting surface area allows more torque to be transmitted between the engaged plates and discs. The secondary friction disc 30 also has a splined central opening for receiving the driven shaft O allowing the secondary friction disc to move axially with respect to the primary friction disc 28, so the secondary friction disc moves and engages the flywheel F. Still more torque is transmittable between the engaged plates and discs in this configuration. The transmittable torque increases if additional clamping force is applied to the primary pressure plate 24.

As will be understood by one skilled in the art, the multiple interfaces provide increased engagement area compared to the area provided by a single friction disc, permitting increased torque transmission through the multiple interfaces. In the disengaged position, the primary and secondary pressure plates 24, 26 release the friction discs 28, 30, allowing the friction discs to rotate independently from the pressure plates. When the primary and secondary pressure plates 24, 26 engage the friction discs 28, 30, the clutch assembly 20 transmits torque between the driving shaft I and the driven shaft O, so the driven shaft turns with the driving shaft. When the primary and secondary pressure plates 24, 26 disengage the friction discs 28, 30, the driving shaft I is substantially free to rotate independently from the driven shaft O.

The materials, shapes, and thicknesses of the strap springs are selected to ensure the strap springs deflect and resiliently return to an undeflected shape. It is envisioned that in some configurations, the combined stiffnesses of the primary strap springs are different than the combined stiffnesses of the secondary strap springs.

The clutch assembly 20 is assembled in a conventional manner

The illustrated clutch assembly has a configuration that enables attachment to a conventional flat flywheel. Many conventional dual-disc, strap-drive clutches have configurations that prevent attachment to flat flywheels. Because many original equipment flywheels are flat, replacing original clutch assemblies with dual-disc, strap-drive clutches often requires flywheel replacement, increasing parts cost and assembly time.

Attaching a mounting ring inside a stamped sheet metal cover provides a stronger and stiffer assembly compared to clutches without a ring attachment. Further, those skilled in the art will appreciate that the annular rib forming the engagement fulcrum stiffens the mounting ring thereby making the assembly stiffer without stamping additional features on the cover.

As various changes could be made in the above constructions, products, and methods without departing from the scope of the invention, it is intended that all matter contained in the above description and shown in the accompanying drawings shall be interpreted as illustrative and not in a limiting sense.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

What is claimed is:

1. A clutch assembly, comprising:
    a cover having an outer flange surrounding a central axis adapted for connecting to a flywheel for turning about the central axis of the cover;
    a mounting ring releasably connected to the cover, said mounting ring including an engagement fulcrum centered about the central axis and a plurality of arms extending outwardly to a strap mount;
    a plurality of resilient strap springs, each strap spring of said plurality of strap springs having a first end releasably connected to the strap mount of a corresponding arm of said plurality of arms and a second end opposite the first end;
    an annular pressure plate having a plurality of outwardly extending tabs, each tab of said plurality of tabs being releasably connected to the second end of a corresponding strap spring of said plurality of strap springs so the plurality of strap springs biases the pressure plate away from the flywheel when the cover flange is connected to the flywheel;
    a keeper releasably connected to the mounting ring, said keeper including a release fulcrum centered about the central axis and opposing the engagement fulcrum of the mounting ring at a predetermined distance from the engagement fulcrum; and
    a resilient diaphragm spring captured between the engagement fulcrum of the mounting ring and the release fulcrum of the keeper, said diaphragm spring having an annular spring body and a plurality of levers, each lever of said plurality of levers extending inwardly from the spring body to an inner end;
    wherein the diaphragm ring biases the annular pressure plate toward the flywheel when the cover is connected to the flywheel, thereby deforming each strap spring of said plurality of strap springs to a configuration in which the strap spring biases the annular pressure plate away from the flywheel when the cover is connected to the flywheel; and
    wherein the diaphragm ring is resiliently deformable by axially displacing the inner ends of the plurality of levers to a deformed position thereby rotating the spring body between the engagement fulcrum and the release fulcrum against the bias of the diaphragm ring and allowing each strap spring of said plurality of strap springs to move the pressure plate away from the flywheel when the cover is connected to the flywheel to disengage the flywheel.

2. A clutch assembly as set forth in claim 1, wherein the strap mount of each arm of said plurality of arms of the mounting ring is axially offset from the fulcrum ridge.

3. A clutch assembly as set forth in claim 1, wherein the strap mount of each arm of said plurality of arms of the mounting ring is axially located between the fulcrum ridge and the outer flange of the cover.

4. A clutch assembly as set forth in claim 1, wherein the cover has a concave surface surrounded by the outer flange.

5. A clutch assembly as set forth in claim 4, wherein the mounting ring is positioned adjacent the concave surface of the cover when connected to the cover.

6. A clutch assembly as set forth in claim 1, wherein each strap spring of said plurality of strap springs comprises a plurality of stacked spring leaves.

7. A clutch assembly as set forth in claim 1, wherein each strap spring of said plurality of strap springs comprises spring steel.

8. A clutch assembly as set forth in claim 1 in combination with a friction disc having a friction surface surrounding a central hub, said pressure plate engaging the friction surface when axially moved to an engaged position thereby enabling the clutch assembly and friction disc to transmit torque between the cover and the central hub of the friction disc.

9. A clutch assembly as set forth in claim 1, further comprising the flywheel releasably connected to the cover for turning with the cover about the central axis.

10. A clutch assembly as set forth in claim 1, wherein:
    said annular pressure plate constitutes a primary pressure plate; and said plurality of strap springs constitutes a plurality of primary strap springs; and
    said clutch assembly further comprises:
    a plurality of secondary strap springs, each strap spring of said plurality of secondary strap springs having a first end releasably connected to the first end of a corresponding strap spring of said plurality of primary strap springs and a second end opposite the first end; and
    a secondary annular pressure plate having a plurality of outwardly extending tabs, each tab of said plurality of tabs of said secondary annular pressure plate being releasably connected to the second end of a corresponding strap spring of said plurality of secondary strap springs, so the plurality of secondary strap springs biases the secondary pressure plate toward a neutral position relative to the first end of the corresponding strap spring of said plurality of primary strap springs.

11. A clutch assembly as set forth in claim 10, wherein said secondary pressure plate is axially movable with respect to said primary pressure plate, so that the second end of each strap spring of said plurality of primary strap springs deflects relative to the corresponding first end by a first distance and the second end of each strap spring of said plurality of secondary strap springs deflects relative to the corresponding first end by a second distance that is different than said first distance.

12. A clutch assembly as set forth in claim 11, wherein each strap spring of said plurality of secondary strap springs has an axial bending stiffness that is equal to an axial bending stiffness of each strap spring of said plurality of primary strap springs.

13. A clutch assembly as set forth in claim 11, further comprising a plurality of spacers, each spacer of said plurality of spacers being positioned between the first end of a corresponding strap spring of said plurality of primary strap springs and the first end of a corresponding strap spring of said plurality of secondary strap springs.

14. A clutch assembly as set forth in claim 10, further comprising the flywheel releasably connected to the cover for turning with the cover about the central axis.

15. A clutch assembly as set forth in claim 14 in combination with:
a first friction disc positioned between said primary pressure plate and said secondary pressure plate, said first friction disc including a first friction surface surrounding a first central hub facing the primary pressure plate and a second friction surface surrounding the first central hub facing the secondary pressure plate, said primary pressure plate engaging the first friction surface of the first friction disc when axially moved to the engaged position, constituting a first engaged position, the second friction surface of the first friction disc engaging the secondary pressure plate when axially moved past the first engaged position to a second engaged position; and
a second friction disc positioned between said secondary pressure plate and the flywheel, said second friction disc including a first friction surface surrounding a second central hub facing the secondary pressure plate and a second friction surface surrounding the second central hub facing the flywheel, said secondary pressure plate engaging the first friction surface of the second friction disc when axially moved to a third engaged position, the second friction surface of the of the second friction disc engaging the flywheel when axially moved past the third engaged position to a fourth engaged position, in which contacting interfaces between the pressure plate and the first friction disc, between the first friction disc and the secondary pressure plate, between the secondary pressure plate and the second friction disc, and between the second friction disc and the flywheel are capable of transmitting torque between the cover and the first and second central hubs of the primary and second friction discs, respectively.

16. A clutch assembly, comprising:
a bowl-shaped cover having a concave face and an outer flange surrounding the concave face and a central axis;
a mounting ring releasably connected to the concave face of the cover, said mounting ring including a fulcrum ridge centered about the central axis and a plurality of arms extending outwardly to a strap mount;
a keeper releasably connected to the mounting ring, said keeper including a release fulcrum centered about the central axis opposing the fulcrum ridge of the mounting ring at a predetermined distance;
a resilient diaphragm spring captured between the fulcrum ridge of the mounting ring and the release fulcrum of the keeper, said diaphragm spring having an annular spring body and a plurality of levers, each lever of said plurality of levers extending inwardly from the spring body to an inner end;
a plurality of primary strap springs, each strap spring of said plurality of primary strap springs having a first end releasably connected to the strap mount of a corresponding arm of said plurality of arms and a second end opposite the first end;
a primary annular pressure plate having a plurality of outwardly extending tabs, each tab of said plurality of tabs being releasably connected to the second end of a corresponding strap spring of said plurality of primary strap springs;
a plurality of secondary strap springs, each strap spring of said plurality of secondary strap springs having a first end releasably connected to the first end of a corresponding strap spring of said plurality of primary strap springs and a second end opposite the first end; and
a secondary annular pressure plate having a plurality of outwardly extending tabs, each tab of said plurality of tabs of said secondary annular pressure plate being releasably connected to the second end of a corresponding strap spring of said plurality of secondary strap springs;
a flywheel releasably connected to the outer flange of the cover;
a first friction disc positioned between said primary pressure plate and said secondary pressure plate, said primary friction disc including a first friction surface surrounding a first central hub facing the primary pressure plate and a second friction surface opposite the first friction surface of the first friction disc facing the secondary pressure plate, said primary pressure plate engaging the first friction surface of the first friction disc when axially moved to a first engaged position and the second friction surface of the first friction disc engaging the secondary pressure plate when axially moved past the first engaged position to a secondary engaged position; and
a second friction disc positioned between secondary pressure plate and the flywheel, said second friction disc including a first friction surface surrounding a second central hub facing the secondary pressure plate and a second friction surface opposite the first friction surface of the second friction disc facing the flywheel, said secondary pressure plate engaging the first friction surface of the second friction disc when axially moved to a third engaged position and said second friction surface of said second friction disc engaging the flywheel when axially moving to a fourth engaged position, in which contacting interfaces between the pressure plate and the first friction disc, between the first friction disc and the secondary pressure plate, between the secondary pressure plate and the second friction disc, and between the second friction disc and the flywheel are capable of transmitting torque between the cover and the first and second central hubs of the primary and second friction discs, respectively.

17. A clutch assembly as set forth in claim 16, wherein the mounting ring has three arms.

18. A clutch assembly as set forth in claim 16 having an equal number of primary strap springs, secondary strap springs, primary pressure plate tabs, secondary pressure plate tabs, and mount ring arms.

19. A clutch assembly, comprising:
a cover having an outer flange surrounding a central axis adapted for connecting to a flywheel for turning about the central axis of the cover;
a mounting ring releasably connected to the cover, said mounting ring including a plurality of arms extending outwardly to a strap mount;
a plurality of resilient strap springs, each strap spring of said plurality of strap springs having a first end releasably connected to the strap mount of a corresponding arm of said plurality of arms and a second end opposite the first end;
an annular pressure plate having a plurality of outwardly extending tabs, each tab of said plurality of tabs being releasably connected to the second end of a corresponding strap spring of said plurality of strap springs so the plurality of strap springs biases the pressure plate away from the flywheel when the cover flange is connected to the flywheel;
a keeper releasably connected to the mounting ring; and
a resilient diaphragm spring positioned between the cover and the keeper, said diaphragm spring having an annular spring body and a plurality of levers, each lever of said plurality of levers extending inwardly from the spring body to an inner end;
wherein the diaphragm ring biases the annular pressure plate toward the flywheel when the cover is connected to the flywheel, thereby deforming each strap spring of said plurality of strap springs to a configuration in which the strap spring biases the annular pressure plate away from the flywheel when the cover is connected to the flywheel; and
wherein the diaphragm ring is resiliently deformable by axially displacing the inner ends of the plurality of levers to a deformed position thereby rotating the spring body between the mounting ring and the keeper against the bias of the diaphragm ring and allowing each strap spring of said plurality of strap springs to move the pressure plate away from the flywheel when the cover is connected to the flywheel to disengage the flywheel.

20. A clutch assembly as set forth in claim 19, wherein the mounting ring is positioned between the cover and the diaphragm spring.

21. A clutch assembly as set forth in claim 20, wherein:
the mounting ring includes an engagement fulcrum for engaging the diaphragm spring; and
the keeper includes a release fulcrum for engaging diaphragm spring.

22. A clutch assembly as set forth in claim 21, wherein at least one of said engagement fulcrum and said release fulcrum is annular.

23. A clutch assembly as set forth in claim 22, wherein both of said engagement fulcrum and said release fulcrum are annular.

24. A clutch assembly as set forth in claim 19, wherein:
the cover has a concave surface surrounded by the outer flange; and
the mounting ring contacts the concave surface.

25. A clutch assembly as set forth in claim 24, wherein:
the concave portion includes a planar surface and a plurality of openings; and
each arm of said plurality of arms of the mounting ring extends through one opening of said plurality of openings.

26. A clutch assembly as set forth in claim 25, wherein each opening of said plurality of openings extends from the concave surface through the outer flange.

27. A clutch assembly as set forth in claim 25, wherein the mounting ring consists of one piece.

28. A clutch assembly as set forth in claim 24, wherein the outer flange includes a plurality of pockets, each pocket of said plurality of pockets being aligned with one of said strap mounts for receiving a head of a fastener extending between the flange and said aligned strap mount.

* * * * *